US012626233B2

(12) United States Patent
Takaoka

(10) Patent No.: US 12,626,233 B2
(45) Date of Patent: May 12, 2026

(54) NON-TRANSITORY COMPUTER-READABLE STORAGE MEDIUM, FUNCTION RESTRICTION METHOD, AND FUNCTION RESTRICTION DEVICE

(71) Applicant: SocialGood, Inc., Tokyo (JP)

(72) Inventor: Soichiro Takaoka, Tokyo (JP)

(73) Assignee: SocialGood, Inc., Tokyo (JP)

( * ) Notice: Subject to any disclaimer, the term of this patent is extended or adjusted under 35 U.S.C. 154(b) by 0 days.

(21) Appl. No.: 18/875,908

(22) PCT Filed: May 31, 2023

(86) PCT No.: PCT/JP2023/020202
§ 371 (c)(1),
(2) Date: Dec. 17, 2024

(87) PCT Pub. No.: WO2024/004493
PCT Pub. Date: Jan. 4, 2024

(65) Prior Publication Data
US 2025/0371509 A1      Dec. 4, 2025

(30) Foreign Application Priority Data
Jun. 27, 2022      (JP) ................................. 2022-102893

(51) Int. Cl.
| *G06Q 20/06* | (2012.01) |
| *G06F 21/12* | (2013.01) |
| *G06Q 20/36* | (2012.01) |
| *G06Q 20/40* | (2012.01) |
| *G06Q 40/04* | (2012.01) |

(52) U.S. Cl.
CPC ....... *G06Q 20/0658* (2013.01); *G06F 21/121* (2013.01); *G06Q 40/042* (2025.08)

(58) Field of Classification Search
CPC . G06Q 20/0658; G06Q 40/042; G06F 21/121
USPC ............................................................. 705/35
See application file for complete search history.

(56) References Cited

U.S. PATENT DOCUMENTS

| 11,361,289 B1 * | 6/2022 | Housser ............. G06Q 20/3825 |
| 2015/0206106 A1 * | 7/2015 | Yago .................. G06Q 20/0655 |
| | | 705/68 |

FOREIGN PATENT DOCUMENTS

| JP | 2015-115722 A | 6/2015 |
| JP | 6598397 B2 | 10/2019 |

OTHER PUBLICATIONS

Kansaku et al., Frontier of financial markets, 1st edition published on Jul. 25, 2019, Chuokeizai Inc., Kei Yamamoto, Tokyo, Japan, pp. 154-156, table 6-6.

(Continued)

*Primary Examiner* — Clifford B Madamba
(74) *Attorney, Agent, or Firm* — Bret E. Field; Bozicevic, Field & Francis LLP

(57) ABSTRACT
A non-transitory computer-readable storage medium storing a function restriction program causing a computer to execute processes of receiving a request including a user ID from a user terminal, acquiring a holding quantity of cryptoassets of a user based on the user ID, generating function restriction information for software executed on the user terminal based on the acquired holding quantity, and transmitting the generated function restriction information to the user terminal.

8 Claims, 21 Drawing Sheets

(56)          References Cited

OTHER PUBLICATIONS

Suzuki, Blockchain 3.0, from domestic and foreign patent to use case, 1st edition published on Dec. 15, 2020, NTS Inc., Takashi Yoshida, Tokyo, Japan, pp. 67-70, fig. 1.

English Translation of International Search Report for PCT Application No. PCT/JP2023/020202 mailed Jul. 4, 2023.

Updates to the Socialgood Ecosystem, https://socialgood.inc/socialgood-ecosystem-updates/, Jun. 1, 2022, Retrieved Dec. 3, 2024.

Why Will the SocialGood Project Continue to Gain Popularity Worldwide?, https://socialgood-whitepaper.com/chapter2/, Jun. 1, 2022, Retrieved Dec. 3, 2024.

Summary, https://socialgood-whitepaper.com/, Jun. 1, 2022, Retrieved Dec. 3, 2024.

* cited by examiner

| User ID | User Name | Holding Quantity | Wallet | Rank | Personal Information |
|---------|-----------|------------------|--------|------|----------------------|
| 10001 | Taro Yamada | 0.45 | ··· | Silver | ··· |
| 10002 | Hanako Tanaka | 1.17 | ··· | Gold | ··· |
| 10003 | Ichiro Sato | 0.04 | ··· | Bronze | ··· |
| ··· | ··· | ··· | ··· | ··· | ··· |

| Affiliated Store ID | Affiliated Store Name | Affiliated Store Information | Commission Rate |
|---|---|---|---|
| 20001 | A | ... | 10% |
| 20002 | B | ... | 5% |
| 20003 | C | ... | 8% |
| ... | ... | ... | ... |

| Purchase ID | Purchaser | Affiliated Store | Date | Purchased Item | Purchase Amount |
|---|---|---|---|---|---|
| 30001 | 10001 | 20001 | 2021/4/1 | a | 40,000 |
| 30002 | 10011 | 20011 | 2021/4/1 | b | 50,000 |
| 30003 | 10111 | 20111 | 2021/4/1 | c | 100,000 |
| ... | ... | ... | ... | ... | ... |

| Date and Time | Token Back | | |
|---|---|---|---|
| | User | Grant Quantity | Purchase ID |
| 2021/4/1 12:00 | 10001 | 0.45 | 30001 |
| 2021/4/1 12:01 | 10011 | 0.27 | 30002 |
| 2021/4/1 12:02 | 10111 | 0.9 | 30003 |
| ... | ... | ... | ... |

| User ID | Withdrawal Quantity | Withdrawal Date and Time | ... |
|---|---|---|---|
| 10002 | 0.05 | 2022/3/10 15:43 | ... |
| ... | ... | ... | ... |

| ID | Display Name | Identifier | ... |
|----|--------------|-----------|-----|
| M1 | Shopping | menu1 | ... |
| M2 | Withdrawal | menu2 | ... |
| ... | ... | ... | ... |

| Market Price<br><br>Market Curculation Quantity | Less Than -5% of the Taget Amount | In a Range of -5% to +5% of the Taget Amount | More Than +5% of the Taget Amount |
|---|---|---|---|
| Less Than 30% of the Issuance Quantity | 0.4 | 0.6 | 1 |
| 30% or More and Less Than 60% | 0.8 | 1 | 1.5 |
| 60% or More of the Issuance Quantity | 1 | 2 | 3 |

| Number | Condition | Not Available | ... |
|---|---|---|---|
| 1 | The Quantity of Held Tokens is Less or Equal to a Threshold | M2 | ... |
| ... | ... | ... | ... |

| User ID | Rule | Not Available | Difference | ... |
|---------|------|---------------|------------|-----|
| 10003 | 1 | M2 | 0.36 Shortage | ... |
| ... | ... | ... | ... | ... |

| User ID | Not Available | Token Back | Start Date and Time | ... |
|---------|---------------|------------|---------------------|-----|
| 10003 | M2 | Impossible | 2022/6/1 | ... |
| ... | ... | ... | ... | ... |

NON-TRANSITORY COMPUTER-READABLE STORAGE MEDIUM, FUNCTION RESTRICTION METHOD, AND FUNCTION RESTRICTION DEVICE

CROSS-REFERENCE TO RELATED APPLICATIONS

This application is the national phase under 35 U. S. C. § 371 of PCT International Application No. PCT/JP2023/020202 which has an International filing date of May 31, 2023 and designated the United States of America.

FIELD

The present invention relates to a non-transitory computer-readable storage medium, a function restriction method, and a function restriction device for restricting a function of software.

BACKGROUND

The use of cryptoassets has been increasing. To ensure scarcity and prevent a decline in value, cryptoassets usually have a limit on issuance. However, to stabilize value, setting a limit on issuance alone is not enough; it is also necessary to control the quantity of cryptoassets circulating in the market.

Since it is difficult to directly control the quantity of cryptoassets circulating in the market, the quantity is indirectly controlled. For example, it is conceivable to control a terminal used by a user who owns cryptoassets, prevent the user from selling cryptoassets, and encourage the user to buy cryptoassets.

Japanese Patent Laid-Open Publication No. 2015-115722 proposes an activation condition control system that controls activation of a function of a terminal.

SUMMARY

However, the conventional system proposed in Japanese Patent Laid-Open Publication No. 2015-115722 only controls the function of the terminal, and does not target the terminal of the user who owns cryptoassets. The invention has been made in consideration of this situation. An object of the invention is to provide a non-transitory computer-readable storage medium, a function restriction method, and a function restriction device that restrict a function of software installed on a terminal used by a user who operates cryptoassets.

A non-transitory computer-readable storage medium storing a function restriction program causing a computer to execute processes of receiving a request including a user ID from a user terminal, acquiring a holding quantity of cryptoassets of a user based on the user ID, generating function restriction information for software executed on the user terminal based on the acquired holding quantity, and transmitting the generated function restriction information to the user terminal.

In an aspect of this application, it is possible to restrict a function of software installed on a terminal used by a user who operates cryptoassets.

BRIEF DESCRIPTION OF THE DRAWINGS

FIG. 4 is an explanatory diagram illustrating an example of a user DB.

FIG. 5 is an explanatory diagram illustrating an example of an affiliated store DB.

FIG. 6 is an explanatory diagram illustrating an example of a purchase history DB.

FIG. 7 is an explanatory diagram illustrating an example of a grant history DB.

FIG. 8 is an explanatory diagram illustrating an example of a withdrawal history DB.

FIG. 9 is an explanatory diagram illustrating an example of a function DB.

FIG. 10 is an explanatory diagram illustrating an example of a threshold DB.

FIG. 11 is an explanatory diagram illustrating an example of a restriction rule DB.

FIG. 12 is an explanatory diagram illustrating an example of a restriction status DB.

FIG. 20 is an explanatory diagram illustrating another example of the restriction status DB.

DETAILED DESCRIPTION

Hereinafter, embodiments will be described with reference to the drawings.

Embodiment 1

Figure 1:
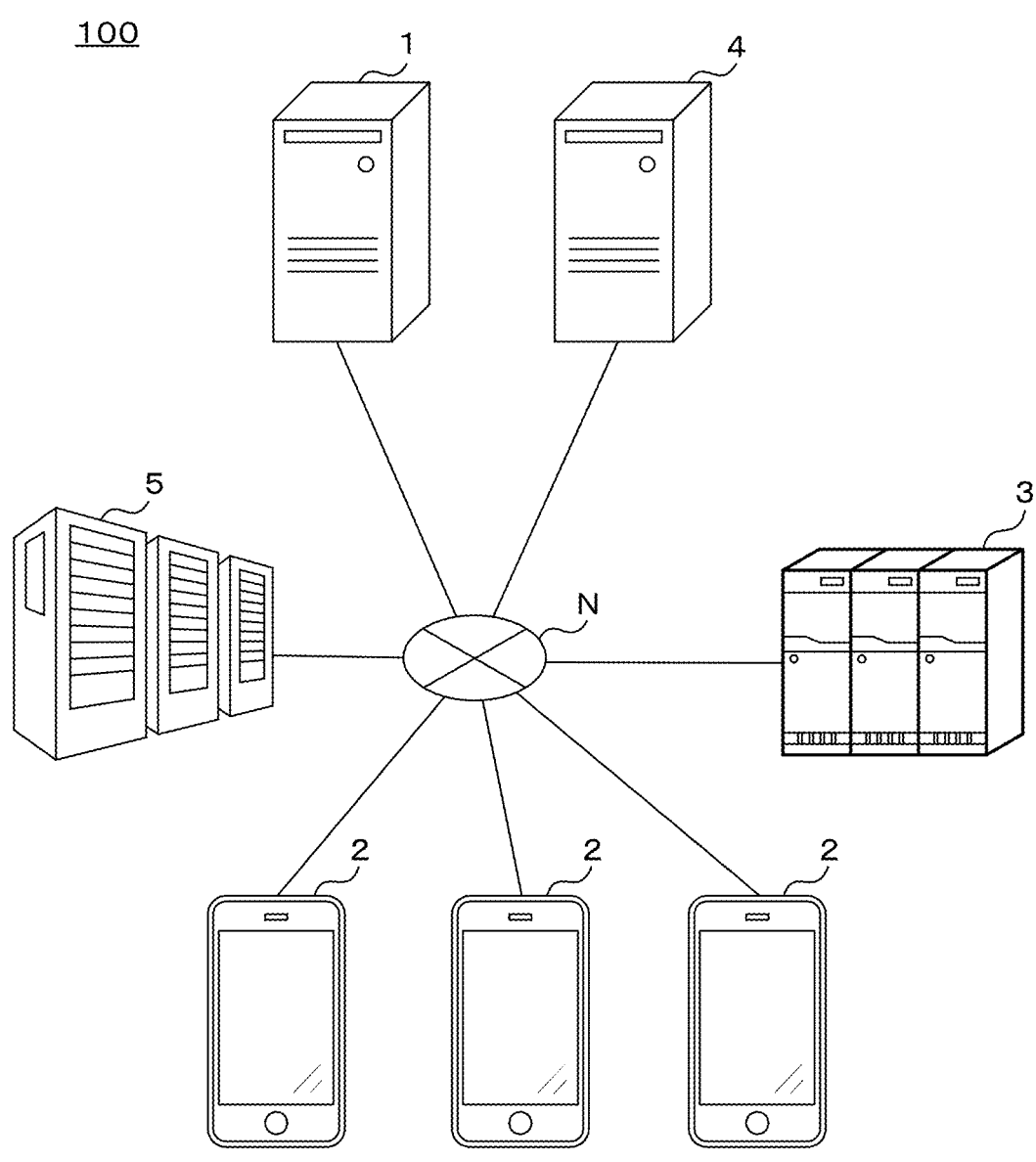
FIG. 1 is an explanatory diagram illustrating a configuration example of a token back system.

FIG. 1 is an explanatory diagram illustrating a configuration example of a token back system. The token back system 100 in this embodiment grants tokens to a user who purchases a product or a service (hereinafter, referred to as "product, etc.") using legal tender at a specific affiliated store. The token back system 100 includes a function restriction device 1, terminals 2, 2, 2 . . . , an exchange server 3, an EC (Electronic Commerce) server 4, and an issuing server 5. The respective devices are connected to be able to communicate with each other via a network N such as the Internet.

The function restriction device 1 can perform various information processing and transmit and receive information, and is configured, for example, as a server computer, a personal computer, etc. In this embodiment, the function restriction device 1 is configured as a server computer, and will be referred to as server 1 below for simplicity. The server 1 is a server computer of an administrator that manages the token back system 100. The server 1 performs processing to provide cash back (token back) in tokens to the user who purchases a product, etc. at an affiliated store affiliated with the token back system 100. The tokens here are unique to this system.

In the token back system 100, there are two types of tokens. The two types of tokens are off-chain tokens and on-chain tokens. Off-chain tokens are valid only in the token back system 100. The quantity of off-chain tokens held by a user is stored in a database managed by this system. Off-chain tokens are not in a state where a transaction history is recorded in a blockchain system (hereinafter referred to as "blockchain"). When the user sells an off-chain token to another person, the token needs to be moved to a wallet. In this instance, the server 1 receives a token issued from an exchange and sends the token to the wallet of the user. The token is an on-chain token whose transaction history is recorded on the blockchain. On-chain tokens are cryptoassets (cryptocurrency or virtual currency) whose transaction history is recorded on the blockchain. Cryptoassets can be obtained and exchanged for cash from an operator (cryptoasset exchanger) referred to as a "clearing house" or an "exchange". In addition, cryptoassets are financial values that can be traded over the Internet.

When the user stores an off-chain token in a wallet as an on-chain token, this is referred to as a withdrawal (withdrawn). The off-chain token exists based on an agreement between an operator of the token back system 100 and the user, and when the user withdraws the off-chain token to the wallet, the off-chain token becomes an on-chain token, that is, a normal cryptoasset. The on-chain token granted by the server 1 does not have to be a unique token. For example, the on-chain token may be an existing cryptoasset such as Bitcoin (registered trademark), Ethereum (registered trademark), Ripple, or NEM. Note that, in this specification, withdrawal and exchange are collectively referred to as transfer.

An off-chain token is a token guaranteed to be exchangeable for an on-chain token at an equivalent rate. In other words, one unit of off-chain tokens can be exchanged for one unit of on-chain tokens. However, the invention is not limited thereto, and points of a point service may be used instead of off-chain tokens. Exchange between points and on-chain tokens does not necessarily have to be 1:1. An exchange ratio may be set, and points may be exchanged for on-chain tokens at the set exchange ratio. For example, when the exchange ratio is 10:1, 10 points can be exchanged for one unit of on-chain tokens. Exchanging off-chain tokens or points for on-chain tokens is also referred to as converting off-chain tokens or points into on-chain tokens.

In this specification, supply and demand information is broadly interpreted without being limited to information related to supply of cryptoassets and information related to demand for cryptoassets. It is assumed that the supply and demand information also includes a market price that fluctuates depending on the balance of supply and demand of cryptoassets, the quantity of issued cryptoassets related to the market circulation quantity, the quantity held by the user and the operator. Information that affects asset values of cryptoassets is referred to as supply and demand information here.

The terminal 2 is a terminal device (user terminal) used by each user who uses the token back system 100. The terminal 2 is, for example, a smartphone, a tablet terminal, a personal computer, etc. In this embodiment, the terminal 2 is described as being configured as a smartphone equipped with a touch panel. An application program (hereinafter, referred to as an "app") for realizing functions related to the token back system 100 is pre-installed in the terminal 2.

The exchange server 3 is a server computer of a cryptoasset exchanger that provides an exchange for virtual currencies. The on-chain token according to this embodiment is listed on one or more exchanges, and users can buy and sell the on-chain token on the exchange.

The EC server 4 is a server computer of an EC site (virtual store) operator that provides electronic commerce services. In addition to an operator that sells products, etc. at a physical store, the EC site operator is affiliated with the token back system 100. Each user can receive an off-chain token when purchasing a product, etc. at an affiliated store, which is a physical store, or an EC site.

The issuing server 5 is a server computer that issues on-chain tokens related to the token back system 100. The issuing server 5 controls an issuance upper limit of on-chain tokens. In this system, the issuing server 5 issues on-chain tokens and supplies the on-chain tokens to a trading market (exchange, etc.). The issuance upper limit of on-chain tokens is stipulated in the issuing server 5, and the issuing server 5 adjusts the issuance quantity while referring to a supply and demand situation of on-chain tokens in the market.

Figure 2:
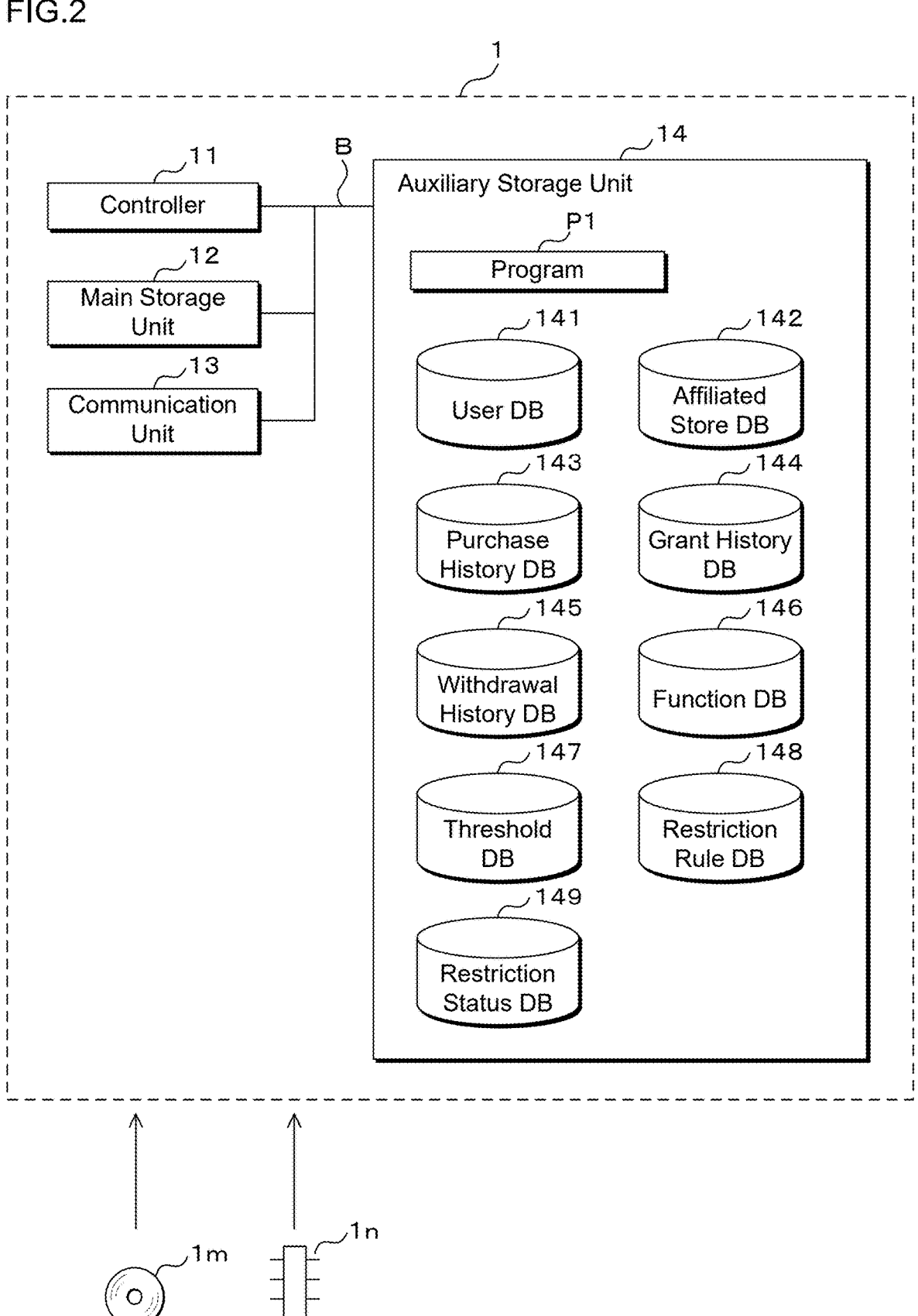
FIG. 2 is a block diagram illustrating a hardware configuration example of a server.

FIG. 2 is a block diagram illustrating a hardware configuration example of the server. The server 1 includes a controller 11, a main storage unit 12, a communication unit 13, and an auxiliary storage unit 14. The controller 11, the main storage unit 12, the communication unit 13, and the auxiliary storage unit 14 are connected by a bus B.

The controller 11 includes one or more arithmetic processing devices such as a central processing unit (CPU), a micro-processing unit (MPU), or a graphics processing unit (GPU). The controller 11 reads and executes a program P1 (program product) stored in the auxiliary storage unit 14 to perform various information processing, control processing, etc. related to the server 1. In addition, the controller 11 executes the program P1 to realize functional units such as a reception unit, an acquisition unit, a generation unit, and a transmission unit.

The main storage unit 12 is a static random access memory (SRAM), a dynamic random access memory (DRAM), a flash memory, etc. The main storage unit 12 temporarily stores data necessary for the controller 11 to execute arithmetic processing.

The communication unit 13 includes a processing circuit for performing processing related to communication, and transmits and receives information to and from the terminal 2, etc.

The auxiliary storage unit 14 is a large-capacity memory, a solid state drive (SSD), a hard disk, etc. The auxiliary storage unit 14 stores the program P1 and other data necessary for the controller 11 to execute processing. In addition, the auxiliary storage unit 14 stores a user DB 141, an affiliated store DB 142, a purchase history DB 143, a grant history DB 144, a withdrawal history DB 145, a function DB 146, a threshold DB 147, a restriction rule DB 148, and a restriction status DB 149. Note that the auxiliary storage unit 14 may be an external storage device connected to the server 1. A database stored in the auxiliary storage unit 14 may be stored in cloud storage.

The server 1 may be configured as a multicomputer including a plurality of computers, a virtual machine virtually constructed by software, or a quantum computer. Furthermore, functions of the server 1 may be realized by a cloud service.

In addition, the server 1 may include a reading unit (not illustrated) for reading a portable storage medium 1m such as a CD (Compact Disk)-ROM or a DVD (Digital Versatile Disk)-ROM, and may read and execute the program P1 from the portable storage medium 1*m*. Alternatively, the server 1 may read the program P1 from a semiconductor memory 1*n*. Further, in addition to the above configuration, the server 1 may include, for example, an input unit for receiving operation input, a display unit for displaying an image, etc.

Figure 3:
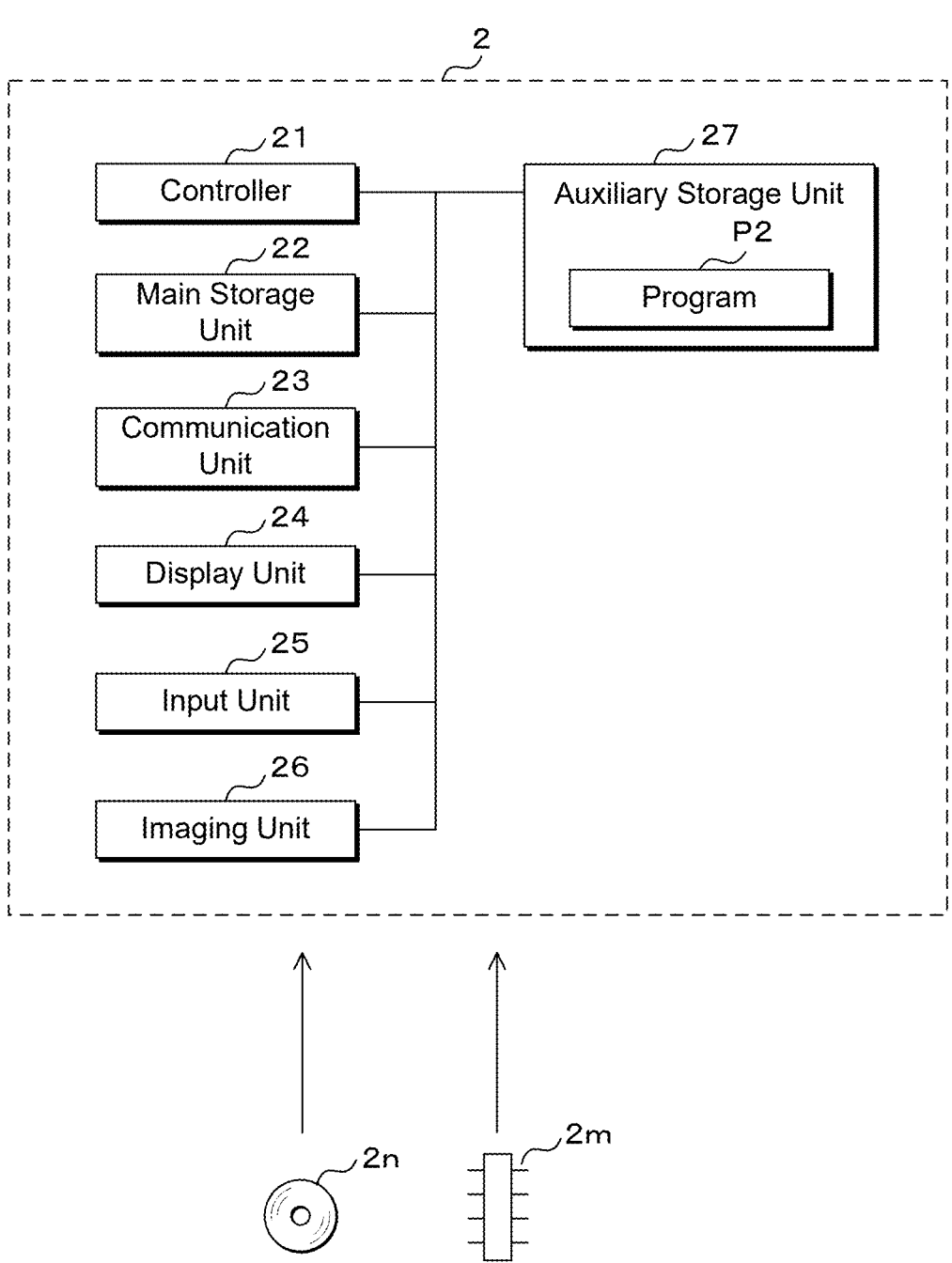
FIG. 3 is a block diagram illustrating a hardware configuration example of a terminal.

FIG. 3 is a block diagram illustrating a hardware configuration example of a terminal. The terminal 2 includes a controller 21, a main storage unit 22, a communication unit 23, a display unit 24, an input unit 25, an imaging unit 26, and an auxiliary storage unit 27.

The controller 21 includes one or more arithmetic processing units such as a CPU, an MPU, etc. The controller 21 reads and executes a program P2 (program product) stored in the auxiliary storage unit 27, thereby performing various information processing, control processing, etc. related to the terminal 2.

The main storage unit 22 is an SRAM, a DRAM, a flash memory, etc. The main storage unit 22 temporarily stores data necessary for the controller 21 to execute arithmetic processing.

The communication unit 23 includes an antenna for communication, a processing circuit, etc. The communication unit 23 transmits and receives information to and from the server 1, etc.

The display unit 24 includes a display panel such as a liquid crystal display or an organic EL (Electro Luminescence) display. The display unit 24 displays an image provided by the controller 21.

For example, the input unit 25 is an input interface such as a touch panel or mechanical keys. The input unit 25 receives operation input from the user.

The imaging unit 26 is a camera including an image sensor such as a complementary metal oxide semiconductor (CMOS) sensor, etc. The imaging unit 26 captures images in accordance with operation input by the user.

The auxiliary storage unit 27 is a large-capacity memory, an SSD, a hard disk, etc., and stores the program P2 and other data required for the controller 21 to execute processing.

Note that the terminal 2 may include a reading unit (not illustrated) for reading a portable storage medium 2*n*, and may read and execute the program P2 from the portable storage medium 2*n*. In addition, the terminal 2 may read the program P2 from a semiconductor memory 2*m*.

FIG. 4 is an explanatory diagram illustrating an example of a user DB. The user DB 141 stores information related to users. The user DB 141 includes a user ID column, a user name column, a holding quantity column, a wallet column, a rank column, and a personal information column. The user ID column stores a user ID for identifying each user. The user name column stores names of the users. The holding quantity column stores the quantity of off-chain tokens held by the user. The wallet column stores wallet information (for example, public key, etc.) required to send on-chain tokens to the user. The rank column stores a rank of the user. The rank is determined by a purchase history (purchase amount and purchase frequency) at the affiliated store, the quantity of held tokens, a holding period, a grant history (acquisition history), a withdrawal history of tokens, etc. Depending on the rank, withdrawal restrictions (transfer restrictions) of tokens may be relaxed. Examples of the rank include diamond, platinum, gold, silver, and bronze, from an upper level. The personal information column stores personal information of the user (gender, age, nationality, etc.).

FIG. 5 is an explanatory diagram illustrating an example of the affiliated store DB. The affiliated store DB 142 stores information related to affiliated stores. The affiliated store DB 142 includes an affiliated store ID column, an affiliated store name column, an affiliated store information column, and a commission rate column. The affiliated store ID column stores an affiliated store ID for identifying each affiliated store. The affiliated store name column stores a name of the affiliated store. The affiliated store information column stores other information related to the affiliated store excluding the name. The commission rate column stores a percentage of commission to be collected from the affiliated store.

FIG. 6 is an explanatory diagram illustrating an example of the purchase history DB. The purchase history DB 143 stores a history of the user purchasing a product and service from the affiliated store. The purchase history DB 143 includes a purchase ID column, a purchaser column, an affiliated store column, a date column, a purchased item column, and a purchase amount column. The purchase ID column stores a purchase ID assigned to each purchase history when the user purchases a product, etc. from the affiliated store. The purchaser column stores a user ID of the user who is a purchaser. The affiliated store column stores an affiliated store ID of the affiliated store from which the user purchased the product, etc. The date column stores a date on which the user purchased the product, etc. The purchased item column stores a name of the product, etc. purchased by the user. The purchase amount column stores the purchase amount of the product, etc.

FIG. 7 is an explanatory diagram illustrating an example of the grant history DB. The grant history DB 144 stores a history (grant history) of granting off-chain tokens to the user. The grant history DB 144 includes a date and time column and a token back column. The date and time column stores a date and time when a token was granted to the user. The token back column stores information related to token back to the user. The token back column further includes a user column, a grant quantity column, and a purchase ID column. The user column stores a user ID of a user to whom the token was granted. The grant quantity column stores the quantity of tokens granted to the user. The purchase ID column stores a purchase ID that identifies a purchase history of a product, etc. triggering token grant. As described above, points may be granted to the user instead of off-chain tokens.

FIG. 8 is an explanatory diagram illustrating an example of the withdrawal history DB. The withdrawal history DB 145 stores a history (transfer history) of the user withdrawing tokens. The withdrawal history DB 145 includes a user ID column, a withdrawal quantity column, and a withdrawal date and time column. The user ID column stores a user ID of a user performing token withdrawal. The withdrawal quantity column stores the quantity of tokens withdrawn by the user (withdrawn quantity or transfer quantity). The withdrawal date and time column stores a date and time when the user performs withdrawal.

FIG. 9 is an explanatory diagram illustrating an example of the function DB. The function DB 146 stores information on functions provided by the program P2 executed on the terminal 2. The function DB 146 includes an ID column, a display name column, and an identifier column. The ID column stores an ID that identifies a function. The display name column stores a name of a function. The name may be the same as a menu name for activating the function. The identifier column stores an identifier of a function in the program P2, an identifier that can identify a function that realizes a function (functionality), etc.

FIG. 10 is an explanatory diagram illustrating an example of the threshold DB. The threshold DB 147 stores information related to a threshold for determining whether or not to impose function restrictions. The threshold DB 147 is a table in which thresholds are determined based on the market price and the market circulation quantity. A column determines the market price, and a row determines the market circulation quantity. The target amount is determined in advance. The threshold is made smaller when the market price is less than −5% of the target amount, the threshold is made larger when the market price is more than +5% of the target amount, and the threshold is set to an intermediate value when the market price is in a range of −5% to +5% of the target amount. The threshold is made smaller when the market circulation quantity is less than 30% of the issuance quantity, the threshold is made larger when the market circulation quantity is 60% or more of the issuance quantity, and the threshold is set to an intermediate value when the market circulation quantity is 30% or more and less than 60% of the issuance quantity. In FIG. 10, the threshold is a fixed value. However, the threshold may be calculated using a predetermined formula from the issuance quantity and the market circulation quantity. Rather than determining the threshold based both on the market price and the market circulation quantity, the threshold may be determined by referring to a table that associates the market circulation quantity with the threshold, or a table that associates the market price with the threshold. The threshold may be calculated by a single arithmetic operation using the market circulation quantity or the market price.

FIG. 11 is an explanatory diagram illustrating an example of the restriction rule DB. The restriction rule DB 148 stores a rule for restricting a function. The restriction rule DB 148 includes a number column, a condition column, and a not available column. The number column stores sequential numbers. The condition column stores a condition for making a function unavailable. For example, the condition is to restrict the case where the quantity of held tokens is less than or equal to a threshold. The threshold is determined by the market circulation quantity or the market price of the tokens. The not available column stores an ID of a function made unavailable.

FIG. 12 is an explanatory diagram illustrating an example of the restriction status DB. The restriction status DB 149 stores a restriction execution status for each user. The restriction status DB 149 includes a user ID column, a rule column, a not available column, and a difference column. The user ID column stores a user ID of the user to whom restriction is imposed. The rule column stores a number of a restriction rule that is applied. The not available column stores an ID of a function that cannot be used by the user due to restriction. The difference column stores a difference from a condition for restriction release. For example, since the quantity of held tokens is less than or equal to a threshold, when restriction is imposed, the insufficient quantity of tokens is stored.

Figure 13:
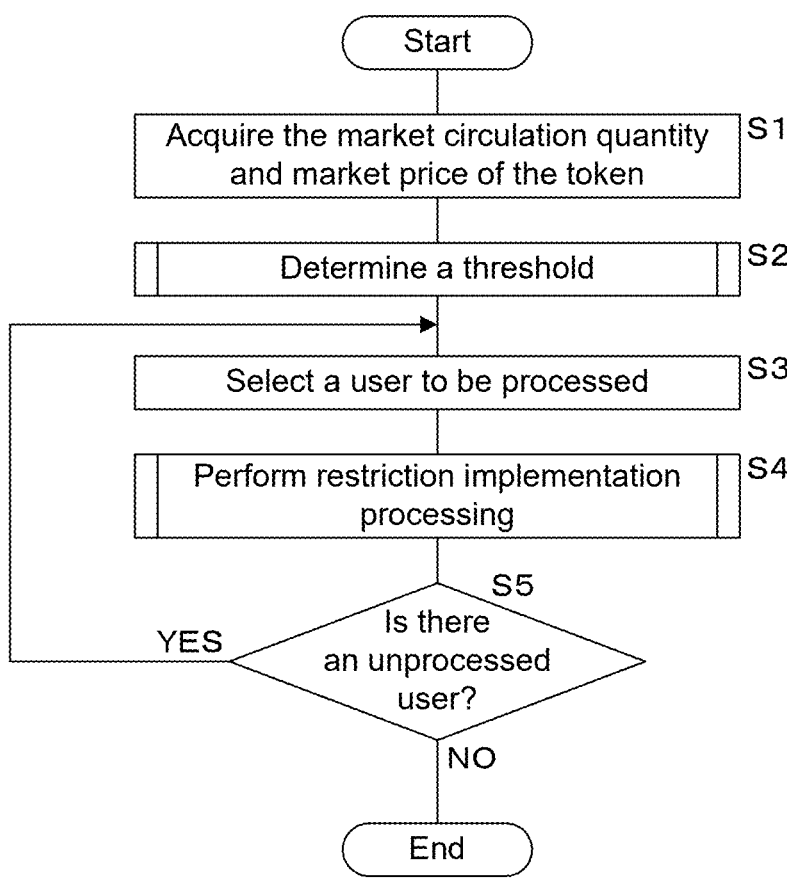
FIG. 13 is a flowchart illustrating a procedure example of restriction processing.

Next, processing performed by the token back system 100 will be described. FIG. 13 is a flowchart illustrating a procedure example of restriction processing. Restriction processing is processing repeatedly executed by daily batch processing, etc. The controller 11 of the server 1 acquires the market circulation quantity and the market price of the token (step S1). The controller 11 determines a threshold for determining whether or not to impose restriction (step S2). Threshold determination processing will be described later.

The controller 11 selects a user to be processed (step S3). The controller 11 performs restriction implementation processing (step S4). The restriction implementation processing will be described later. The controller 11 determines whether or not there is an unprocessed user (step S5). Upon determining that there is an unprocessed user (YES in step S5), the controller 11 returns the process to step S3 and performs processing on the unprocessed user. Upon determining that there is no unprocessed user (NO in step S5), the controller 11 ends the process.

Figure 14:
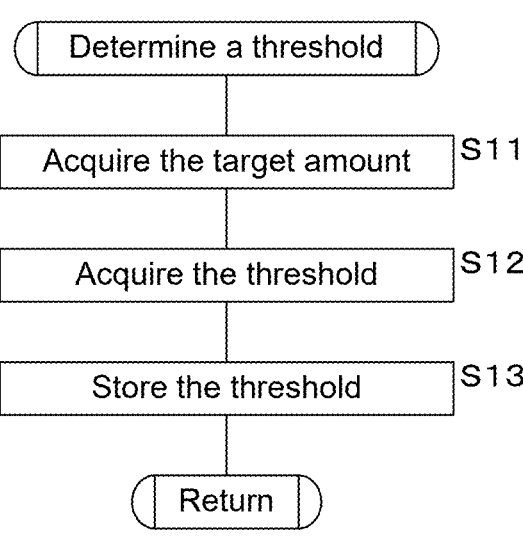
FIG. 14 is a flowchart illustrating a procedure example of threshold determination processing.

FIG. 14 is a flowchart illustrating a procedure example of the threshold determination processing. The threshold determination processing corresponds to step S2 of FIG. 13. The controller 11 acquires the target amount (step S11). The target amount is determined in advance. The controller 11 acquires the threshold from the threshold DB 147 based on the market circulation quantity, the market price, and the target amount (step S12). The controller 11 stores the threshold in a temporary storage area (step S13). The temporary storage area is provided in the main storage unit 12 or the auxiliary storage unit 14, and the process is returned to the caller. The above-mentioned target amount may be obtained by calculation based on an exchange rate or a market price of other cryptoassets.

Figure 15:
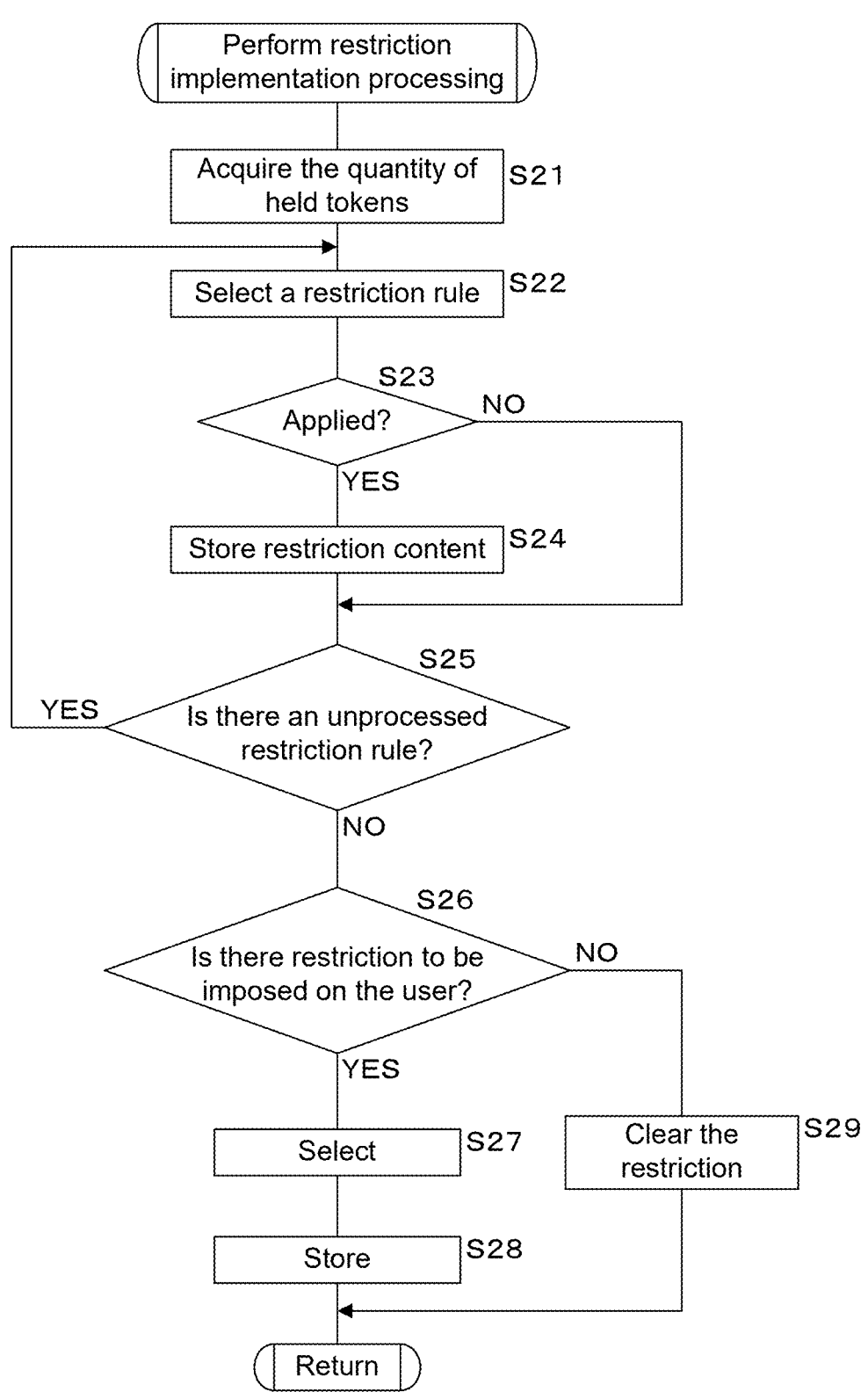
FIG. 15 is a flowchart illustrating a procedure example of restriction implementation processing.

FIG. 15 is a flowchart illustrating a procedure example of restriction implementation processing. The restriction implementation processing is processing corresponding to step S4 of FIG. 13. The controller 11 acquires the quantity of held tokens of a processing target user from the user DB 141 (step S21). The controller 11 refers to the restriction rule DB 148 and selects a restriction rule to be determined (step S22). The controller 11 determines whether or not restriction is applied (step S23). Upon determining that restriction is not applied (NO in step S23), the controller 11 causes the process to proceed to step S25. Upon determining that restriction is applied (YES in step S23), the controller 11 stores restriction content in a temporary storage area (step S24). The controller 11 determines whether or not there is an unprocessed restriction rule (step S25). Upon determining that there is an unprocessed restriction rule (YES in step S25), the controller 11 returns the process to step S22 and processes the unprocessed restriction rule. Upon determining that there is no unprocessed restriction rule (NO in step S25), the controller 11 determines whether or not there is restriction to be imposed on the user (step S26). When restriction content is stored in the temporary storage area, the controller 11 determines that there is restriction. When restriction content is not stored in the temporary storage area, the controller 11 determines that there is no restriction. Upon determining that there is restriction imposed on the user (YES in step S26), the controller 11 selects content of actually imposed restriction (step S27). When a plurality of pieces of restriction content is stored in the temporary storage area, the controller 11 selects the strongest piece of restriction content. When one piece of restriction content is stored in the temporary storage area, the controller 11 selects the restriction content. For example, the strength of restriction content can be determined by the number of the restriction rule. The controller 11 stores content of restriction imposed on the user in the restriction status DB 149 (step S28). Upon determining that there is no restriction imposed on the user (NO in step S26), the controller 11 clears the restriction (step S29). When restriction content of a target user is stored in the restriction status DB 149, the controller 11 deletes the restriction content. When the restriction content of the target user is not stored, the controller 11 does not perform particular processing. The controller 11 returns the processing to the caller.

Figure 16:
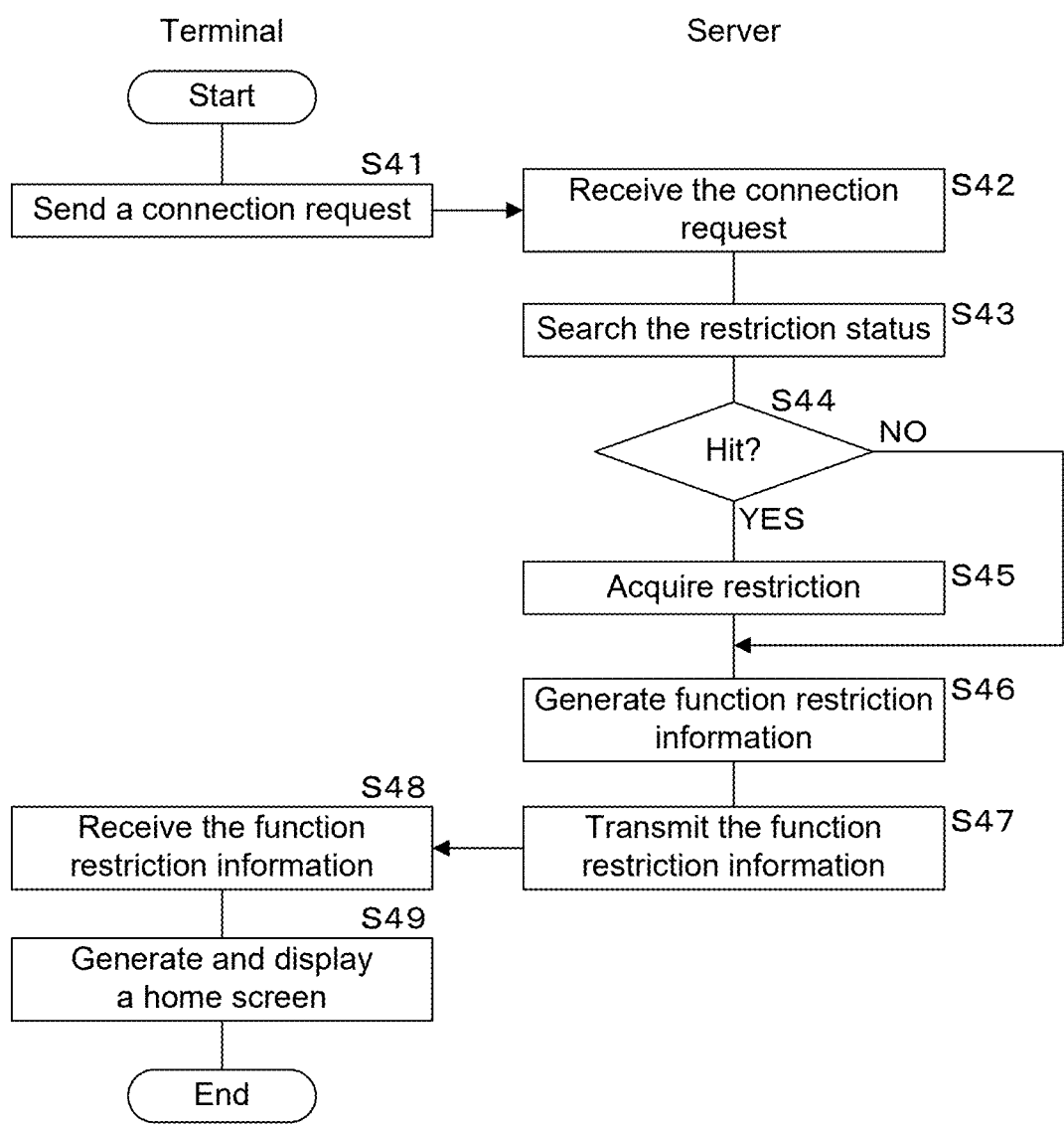
FIG. 16 is a flowchart illustrating a procedure example of home screen display processing.

FIG. 16 is a flowchart illustrating a procedure example of home screen display processing. A home screen is a screen displayed first when an application is started on the terminal 2. The controller 21 of the terminal 2 sends a connection request to the server 1 (step S41). The connection request includes a user ID. The controller 11 of the server 1 receives the connection request (step S42). The controller 11 searches a restriction status (step S43). The controller 11 searches the restriction status DB 149 using a user ID included in the received request as a key. The controller 11 determines whether or not search has found a hit (step S44). Upon determining that search has not found a hit (NO in step S44), the controller 11 causes the process to proceed to step S46. Upon determining that search has found a hit (YES in step S44), the controller 11 acquires restriction from the restriction status DB 149 (step S45). The controller 11 generates function restriction information (step S46). The controller 11 transmits the function restriction information to the terminal 2 (step S47). The controller 21 of the terminal 2 receives the function restriction information (step S48). The controller 21 generates a home screen based on the function restriction information and displays the home screen on the display unit 24 (step S49). The controller 21 calls a template of the home screen from the auxiliary storage unit 14 and generates a home screen reflecting the received function restriction information. The template of the screen is included in the app or is stored in the auxiliary storage unit 14 when the app is installed. For example, when a withdrawal function (transfer function) is restricted, "withdrawal" displayed as a menu is in an unselectable state and cannot be executed. The controller 21 ends the process.

The function restriction information is transmitted from the server 1 to the terminal 2. However, the invention is not limited thereto. The server 1 may generate a home screen and transmit the home screen to the terminal 2. When the home screen includes a menu that calls a function subject to restriction, the controller 11 of the server 1 prevents the menu from being selected. In addition, the controller 11 embeds restriction content in the home screen using a hidden item, etc. A reason is to enable the terminal 2 to impose restriction on the function called from other than the home screen.

Figure 17:
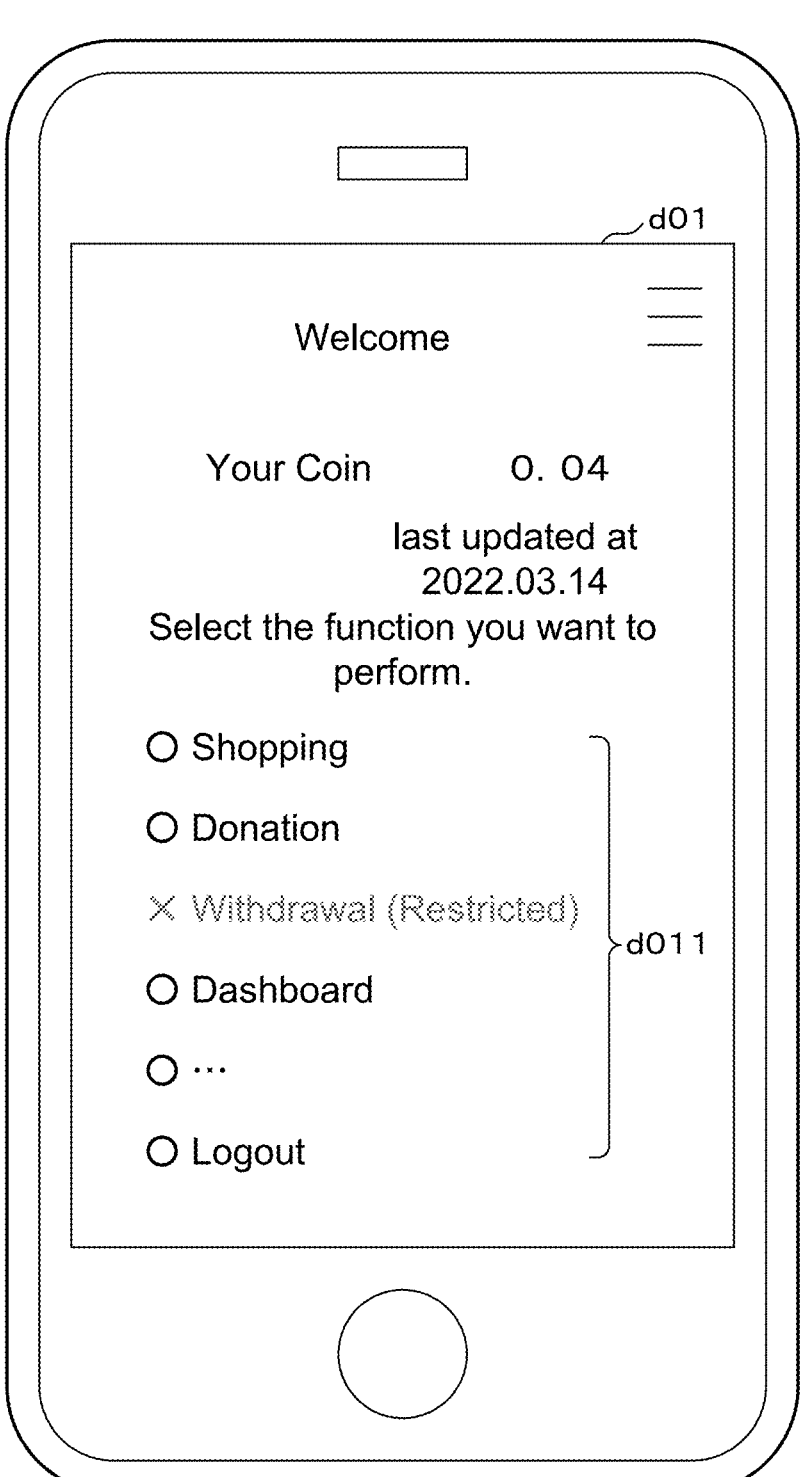
FIG. 17 is an explanatory diagram illustrating an example of a home screen.

FIG. 17 is an explanatory diagram illustrating an example of the home screen. A home screen d01 includes a menu d011. As the menu d011, shopping, donation, withdrawal, dashboard, and logout are listed in FIG. 17. In the menu, "withdrawal" is restricted and cannot be executed.

Figure 18:
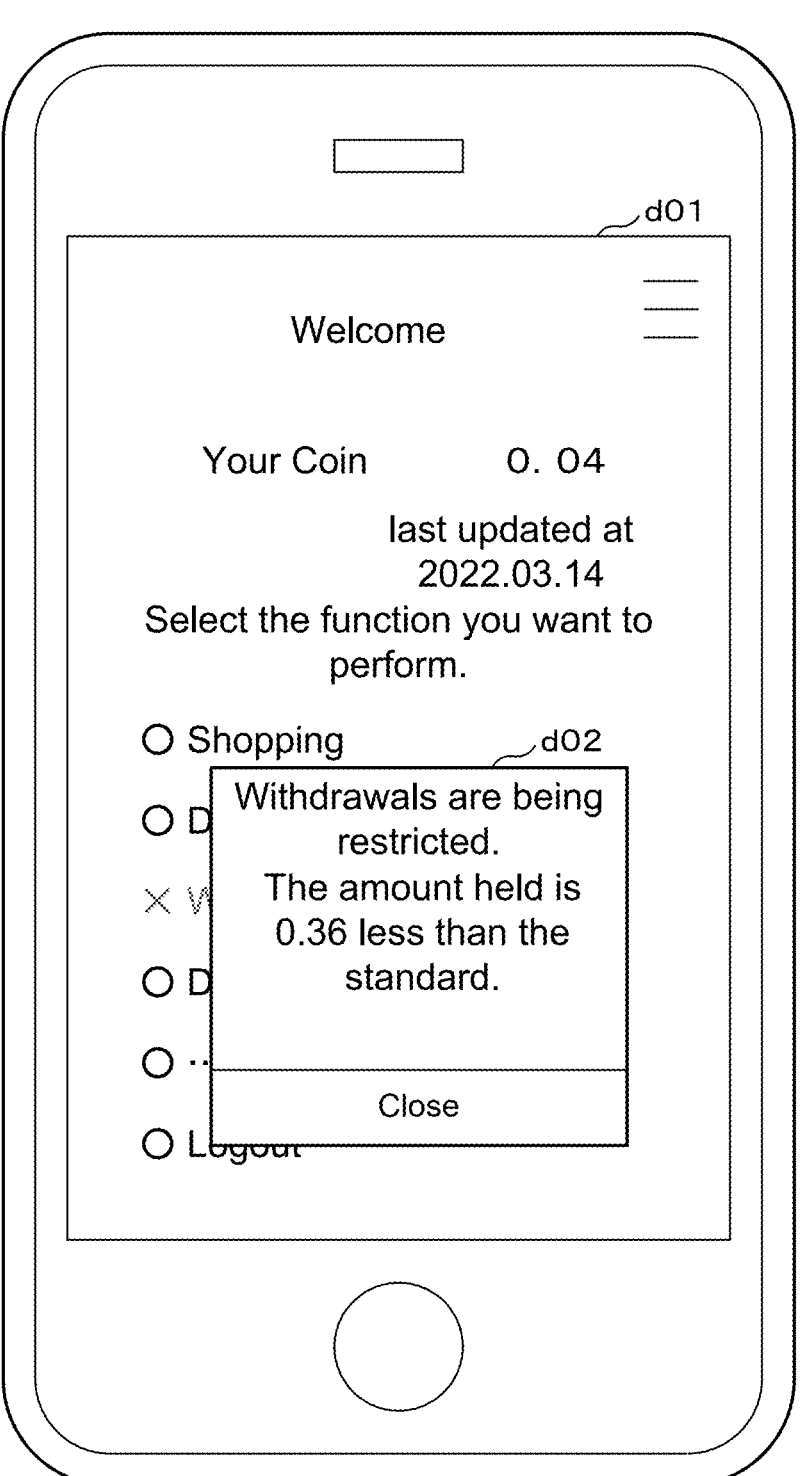
FIG. 18 is an explanatory diagram illustrating an example of a shortage screen.

FIG. 18 is an explanatory diagram illustrating an example of a shortage screen. A shortage screen d02 is displayed as an overlay on the home screen d01 when a restricted menu is tapped. The shortage screen d02 displays a reason why the menu (function) is restricted. FIG. 18 illustrates that the holding quantity is less than a standard value (threshold).

In this embodiment, when the quantity of held tokens falls below a threshold, the function of the app is restricted. Therefore, the user tries to increase the quantity of tokens granted to be able to use the function of the app. In this way, tokens circulating in the market are collected by the user. As a result, it becomes possible to indirectly control the market circulation quantity of the tokens. Furthermore, a change in the market circulation quantity causes a change in the market price of the token. By determining the threshold based on the market circulation quantity and the market price of the tokens, in this embodiment, it becomes possible to control the market circulation quantity and the market price of the tokens.

Modified Example

In the above description, a condition for restricting the function is the quantity of held tokens. However, the invention is not limited thereto. Another condition, such as the rank of the user, may be added. For example, a condition for imposing restriction may be "the holding quantity is less than or equal to a threshold and the rank is not diamond". In this case, even when the holding quantity of the user is less than or equal to the threshold, if the rank is diamond, function restriction is not imposed.

Figure 19:
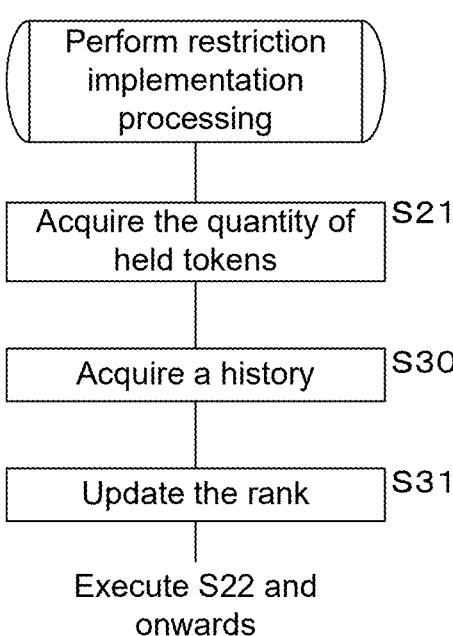
FIG. 19 is a flowchart illustrating another procedure example of restriction implementation processing.

FIG. 19 is a flowchart illustrating another procedure example of the restriction implementation processing. The restriction implementation processing here is obtained by adding a processing step to the restriction implementation processing illustrated in FIG. 15. The controller 11 acquires the quantity of held tokens of the processing target user from the user DB 141 (step S21). The controller 11 acquires a history of the processing target user (step S30). For example, the controller 11 acquires the purchase history, token grant history, and token withdrawal history of the processing target user from the purchase history DB 143, the grant history DB 144, and the withdrawal history DB 145, respectively. The controller 11 updates the rank of the processing target user based on the acquired history, and stores the updated rank in the user DB 141 (step S31). The controller 11 executes step S22 and subsequent steps illustrated in FIG. 15.

In this modified example, no restriction can be imposed on a high-ranking user, and thus it is possible to control the market circulation quantity and the market price of the tokens without dissatisfying a user who contributes to a stable operation of the tokens.

In the above description, when a function is restricted, the function cannot be used at all. However, the invention is not limited thereto. The use of the function may be permitted while restricting content of use of the function. For example, in the case of a withdrawal function, restriction may be imposed on the quantity allowing withdrawal, and withdrawal may be allowed within a range of the restricted quantity. The restricted quantity is determined based on the threshold, the holding quantity of the user, the market circulation quantity, the market price, etc.

In addition, when a wallet that stores on-chain tokens of cryptoassets can be controlled by an app, a function to sell cryptoassets may be selected as a function to be restricted. Similarly to withdrawal, it is possible to either restrict the selling function itself, or to allow the selling function but restrict the selling quantity. The selling quantity is determined based on the threshold, the holding quantity of the user, the market circulation quantity, the market price, etc.

Embodiment 2

This embodiment relates to a case where a threshold for determining whether or not to restrict a function is a fixed value. In an aspect in which a threshold is varied as in Embodiment 1, the user may not be able to predict whether or not the function will be restricted, and thus this point is taken into consideration in this embodiment. Note that the threshold is stored in the auxiliary storage unit 14 in advance, or is embedded in a program, etc. In addition, when the threshold is changed, it is considered desirable to provide a sufficient notice period.

FIG. 20 is an explanatory diagram illustrating another example of the restriction status DB. The restriction status DB 149 includes a user ID column, a not available column, a token back column, and a start date and time column. The user ID column stores a user ID of a user to whom restriction is imposed. The not available column stores an ID of a function that cannot be used by the user due to restriction. The token back column stores whether or not token back is restricted. When token back is restricted, the user cannot receive token back even when the user purchases a product, etc. at an affiliated store. The start date and time column stores a date and time when restriction started.

Figure 21:
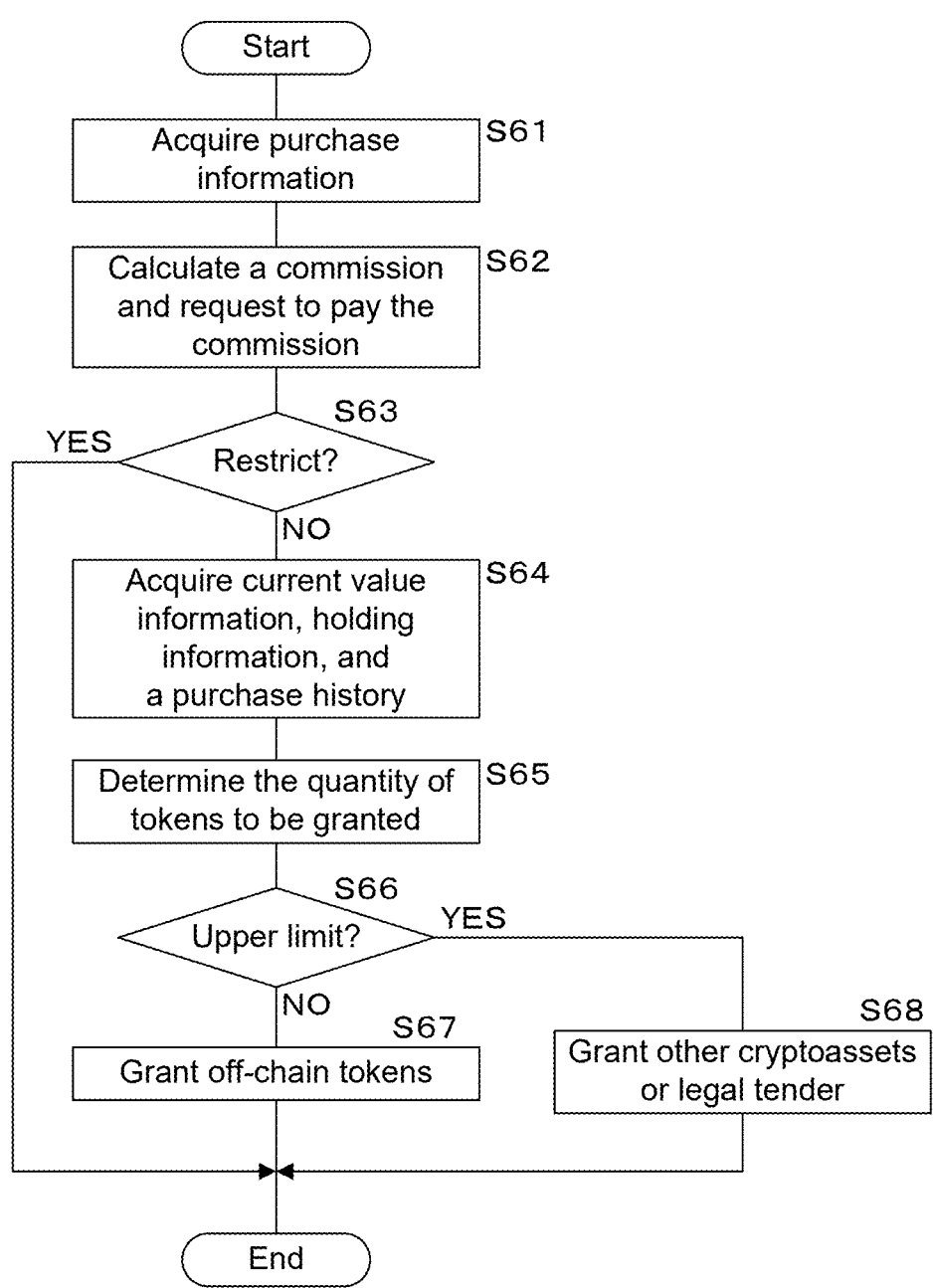
FIG. 21 is a flowchart illustrating a procedure example of token back processing.

Information processing in this embodiment will be described. FIG. 21 is a flowchart illustrating a procedure example of token back processing. This process is initiated in response to the user purchasing a product, etc. at an affiliated store. The controller 11 of the server 1 acquires purchase information related to the product, etc. purchased by the user from the terminal 2 or the EC server 4 (step S61). The controller 11 reads a commission rate of the affiliated store from the affiliated store DB 142, calculates a commission according to the purchase amount of the product, etc., and requests the affiliated store to pay the commission (step S62). The controller 11 determines whether to restrict token back to the user (step S63). The controller 11 performs determination by referring to the token back column of the restriction status DB 149. Upon determining to restrict token back to the user (YES in step S63), the controller 11 ends a series of processes. Upon determining not to restrict token back to the user (NO in step S63), the controller 11 acquires current value information of tokens (cryptoassets) in the trading market, holding information on tokens held by the user, and a purchase history of the user at the affiliated store (step S64). The current value information is data indicating a current value of the token (equivalent to legal tender) and is data indicating the market price of cryptoassets in the trading market (exchange, etc.). The holding information is data indicating a holding status of tokens held by the user, and is, for example, data indicating the quantity of held tokens, a holding period, etc. The purchase history is a purchase history of the product, etc. by the user at the affiliated store, and is, for example, data indicating the purchase amount, a purchase date, etc. The controller 11 determines the quantity of tokens to be granted to the user (step S65). The controller 11 determines the quantity by multiplying the current purchase amount by a predetermined rebate rate. The rebate rate has a value that increases as the quantity of held tokens increases and as the purchase amount in a predetermined period increases. The rebate rate may be changed according to a rank of the user. The controller 11 acquires information related to the current token issuance quantity from the issuing server 5, and determines whether or not the token issuance upper limit has been reached (step S66). Upon determining that the issuance upper limit has been reached (YES in S66), the controller 11 grants other cryptoassets or legal tender different from the tokens of this system to the user (step S68), and ends a series of processes. Upon determining that the issuance upper limit has not been reached (NO in S66), the controller 11 grants off-chain tokens, the quantity of which is determined in step S65 (step S67), and ends a series of processes.

In this embodiment, the restriction processing, the restriction implementation processing, and the home screen display processing are the same as those of Embodiment 1, and therefore a description thereof will be omitted. Note that, in this embodiment, the threshold is a fixed value, and thus the threshold determination processing is not executed.

In this embodiment, by setting the threshold to a fixed value, the user can always detect whether or not function restriction is imposed. In addition, many users continue to hold cryptoassets greater than or equal to the threshold to avoid function restriction. In this way, an increase in the value of cryptoassets can be expected as the number of users increases.

It would be harsh on the user to be restricted from receiving token back as soon as the holding quantity of cryptoassets of the user falls below the threshold, and thus a grace period may be given. For example, the grace period may be two weeks after it is determined that the holding quantity falls below the threshold. When the holding quantity of the user reaches the threshold during the grace period, no restriction is imposed. Even when the grace period has passed, if the holding quantity of the user falls below the threshold, token back cannot be received. In this case, the user needs to raise cryptoassets from the market so that restriction is released.

Since an initial user does not possess cryptoassets immediately after user registration, restriction is imposed immediately after registration. To avoid this, cryptoassets greater than or equal to the threshold may be given to the user as a bonus at the time of user registration. A condition may be attached to granting of the bonus, and the bonus may be invalidated when the product, etc. is not purchased at the affiliated store within a specified period. Alternatively, the bonus may not be granted, and restriction may not be imposed when the product, etc. is purchased at the affiliated store within a specified period, token back is received, and the holding quantity reaches greater than or equal to the threshold.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A non-transitory computer-readable storage medium storing a function restriction program for automated distributed processing causing a computer to execute processes of:
   receiving a request including a user ID from a user terminal;
   acquiring a holding quantity of tokens associated with a user based on the user ID;
   generating function restriction information for software executed on the user terminal based on the acquired holding quantity, wherein generating function restriction information comprises comparing the holding quantity with a threshold and further comprises restriction information related to transferring tokens without a blockchain-recorded transaction history into tokens with a blockchain-recorded transaction history; and
   transmitting the generated function restriction information to the user terminal.

2. The non-transitory computer-readable storage medium storing the function restriction program according to claim 1, wherein the function restriction program causes the computer to execute a process of setting the function restriction information to information indicating that no restriction is imposed, when the holding quantity is greater than or equal to a threshold.

3. The non-transitory computer-readable storage medium storing the function restriction program according to claim 1, wherein the function restriction program causes the computer to execute a process of setting the function restriction information to information indicating that some functions of the software are invalid, when the holding quantity is less than a threshold.

4. The non-transitory computer-readable storage medium storing the function restriction program according to claim 1, wherein the function restriction program causes the computer to execute a process of setting the function restriction information to information indicating restriction of a transfer function of converting points or off-chain cryptoassets held by the user into on-chain cryptoassets among functions of the software, when the holding quantity is less than a threshold.

5. The non-transitory computer-readable storage medium storing the function restriction program according to claim 2, wherein the tokens are associated with cryptoassets, and the function restriction program causes the computer to execute a process of determining the threshold by a market price or a market circulation quantity of the cryptoassets.

6. The non-transitory computer-readable storage medium storing the function restriction program according to claim 2, wherein the function restriction program causes the computer to execute a process of transmitting a difference between the holding quantity and the threshold to the user terminal.

7. A function restriction method for automated distributed processing of executing, by a computer, processes of:

receiving a request including a user ID from a user terminal;

acquiring a holding quantity of tokens associated with a user based on the user ID;

generating function restriction information for software executed on the user terminal based on the acquired holding quantity, wherein generating function restriction information comprises comparing the holding quantity with a threshold and further comprises restriction information related to transferring tokens without a blockchain-recorded transaction history into tokens with a blockchain-recorded transaction history; and transmitting the generated function restriction information to the user terminal.

8. An information processing device for automated distributed processing comprising:

at least one memory; and at least one processor configured to execute instructions stored in the memory to:

receive a request including a user ID from a user terminal;

acquire a holding quantity of tokens associated with a user based on the user ID;

generate function restriction information for software executed on the user terminal based on the acquired holding quantity, wherein generating function restriction information comprises comparing the holding quantity with a threshold and further comprises restriction information related to transferring tokens without a blockchain-recorded transaction history into tokens with a blockchain-recorded transaction history; and transmit the generated function restriction information to the user terminal.

* * * * *